US009103484B2

(12) United States Patent
Hayashi et al.

(10) Patent No.: US 9,103,484 B2
(45) Date of Patent: Aug. 11, 2015

(54) CONNECTION DEVICE

(75) Inventors: Toyofumi Hayashi, Hamamatsu (JP);
Tomohiko Kamimura, Habikino (JP);
Satoru Fujiwara, Izumi (JP); Hiroyoshi Shinozuka, Kashiba (JP); Takuro Michinomoto, Osaka (JP)

(73) Assignees: Yamaha Corporation, Hamamatsu-shi (JP); Hosiden Corporation, Yao-shi (JP)

( * ) Notice: Subject to any disclaimer, the term of this patent is extended or adjusted under 35 U.S.C. 154(b) by 585 days.

(21) Appl. No.: 12/898,446

(22) Filed: Oct. 5, 2010

(65) Prior Publication Data

US 2011/0079701 A1 Apr. 7, 2011

(30) Foreign Application Priority Data

Oct. 6, 2009 (JP) ................................. 2009-232894

(51) Int. Cl.
| | |
|---|---|
| *G06F 1/16* | (2006.01) |
| *H05K 5/00* | (2006.01) |
| *H05K 7/00* | (2006.01) |
| *F16M 13/00* | (2006.01) |
| *H04M 1/04* | (2006.01) |
| *H02J 7/00* | (2006.01) |

(52) U.S. Cl.
CPC .............. *F16M 13/00* (2013.01); *G06F 1/1626* (2013.01); *H02J 7/0044* (2013.01); *H04M 1/04* (2013.01)

(58) Field of Classification Search
USPC ......... 248/176.1, 346.01, 146, 148, 682, 686, 248/688, 127, 309.1, 310, 311.2, 917–924, 248/139, 671; 361/679.41–679.44, 679.3, 361/679.55, 679.56; 174/50, 520, 53, 57, 174/58, 559, 59; 439/248

See application file for complete search history.

(56) References Cited

U.S. PATENT DOCUMENTS

| | | | | |
|---|---|---|---|---|
| 5,480,115 | A | * | 1/1996 | Haltof ..................... 248/221.11 |
| 6,042,414 | A | * | 3/2000 | Kunert .......................... 439/374 |
| 6,113,409 | A | * | 9/2000 | Park .............................. 439/310 |

(Continued)

FOREIGN PATENT DOCUMENTS

| | | |
|---|---|---|
| CN | 1344459 A | 4/2002 |
| CN | 101312468 A | 11/2008 |

(Continued)

OTHER PUBLICATIONS

Combined Chinese Office Action and Search Report dated Aug. 13, 2012 including English-language translation. (Nineteen (19) pages).

(Continued)

*Primary Examiner* — Terrell McKinnon
*Assistant Examiner* — Michael McDuffie
(74) *Attorney, Agent, or Firm* — Crowell & Moring LLP

(57) ABSTRACT

A connection device includes: a pedestal having a placement face; a connector provided in the placement face of the pedestal; a support provided adjacent to the pedestal and extended in a direction crossing the placement surface of the pedestal and having a face to define a space for placing a portable terminal on the connector and on a contact face in the face of the support, the contact face being movable in a thickness direction of the support; and an elastic member that is deformed by the movement of the contact face and applies an elastic force generated by the deformation in a direction of blocking the movement of the contact face with respect to the thickness direction of the support.

10 Claims, 7 Drawing Sheets

(56) References Cited

U.S. PATENT DOCUMENTS

| | | | |
|---|---|---|---|
| 6,193,546 B1 | 2/2001 | Sadler | |
| 6,290,534 B1 | 9/2001 | Sadler | |
| 7,014,486 B1 * | 3/2006 | Wu et al. | 439/248 |
| 7,033,199 B2 * | 4/2006 | Funatsu | 439/341 |
| 7,066,752 B2 * | 6/2006 | Hsu et al. | 439/248 |
| 7,386,868 B2 * | 6/2008 | McCormack | 720/657 |
| 7,929,291 B2 | 4/2011 | Park et al. | |
| 7,956,577 B2 | 6/2011 | Fujii et al. | |
| 2006/0250764 A1 * | 11/2006 | Howarth et al. | 361/683 |
| 2008/0237416 A1 * | 10/2008 | Osada | 248/176.1 |
| 2009/0129010 A1 * | 5/2009 | Park et al. | 361/679.56 |

FOREIGN PATENT DOCUMENTS

| | | |
|---|---|---|
| CN | 101436872 A | 5/2009 |
| JP | 2003-110677 A | 4/2003 |
| JP | 2003-298249 A | 10/2003 |
| JP | 2003-309637 A | 10/2003 |
| JP | 2004-135119 A | 4/2004 |
| JP | 2007-96883 A | 4/2007 |
| JP | 2008-92159 A | 4/2008 |
| WO | WO 2009/078062 A1 | 6/2009 |

OTHER PUBLICATIONS

Chinese Search Report Dated Jun. 5, 2013 {Two (2) Pages}.

* cited by examiner

CONNECTION DEVICE

BACKGROUND OF THE INVENTION

1. Technical Field

The present invention relates to a connection device to which a portable terminal is connected.

2. Background Art

What is referred to as a cradle is known as a connection device to which a portable terminal, such as a portable telephone or a portable music player, is connected. This kind of connection device is used to charge the secondary battery built in the terminal or used for connection to an external apparatus, such as a personal computer. For example, each of JP-2007-96883A and JP-2004-135119A discloses a cradle that can be commonly used for plural kinds of portable terminals. JP-2007-96883A discloses a configuration in which mounting sections individually capable of allowing various sizes of portable terminals to be mounted are replaceable with respect to the main body of the cradle. JP-2004-135119A discloses a mechanism capable of changing the position of the connector of a cradle.

In the cradle described in JP-2007-96883A, however, the mounting section is required to be replaced each time a different kind of terminal is connected, and it is sometimes troublesome for the user to perform the replacement. In the cradle described in JP-2004-135119A, the portable terminal mounted on the cradle is not secured to the main body of the cradle. Hence, an excessive load may be applied to the terminal, and there is a danger that the terminal may be disconnected from the connector of the cradle or the connection sections of the terminal and the cradle may be broken.

SUMMARY OF THE INVENTION

In consideration of the above-mentioned problems, an object of the present invention is to provide a connection device that can be commonly used for a plurality of portable terminals being different in thickness without replacement of the component while stabilizing the attitude of each portable terminal to be secured The present invention provides a connection device comprising: a pedestal having a placement face; a connector provided in the placement face of the pedestal; a support provided adjacent to the pedestal and extended in a direction crossing the placement surface of the pedestal and having a face to define a space for placing a portable terminal on the connector and on a contact face in the face of the support, the contact face being movable in a thickness direction of the support; and an elastic member that is deformed by the movement of the contact face and applies an elastic force generated by the deformation of the elastic member in a direction of blocking the movement of the contact face with respect to the thickness direction of the support.

With the present invention, the connection device can be commonly used for a plurality of portable terminals being different in thickness without replacement of the component, and the attitude of each portable terminal to be secured can be stabilized.

DETAILED DESCRIPTION OF THE EXEMPLARY EMBODIMENTS

Figure 1:
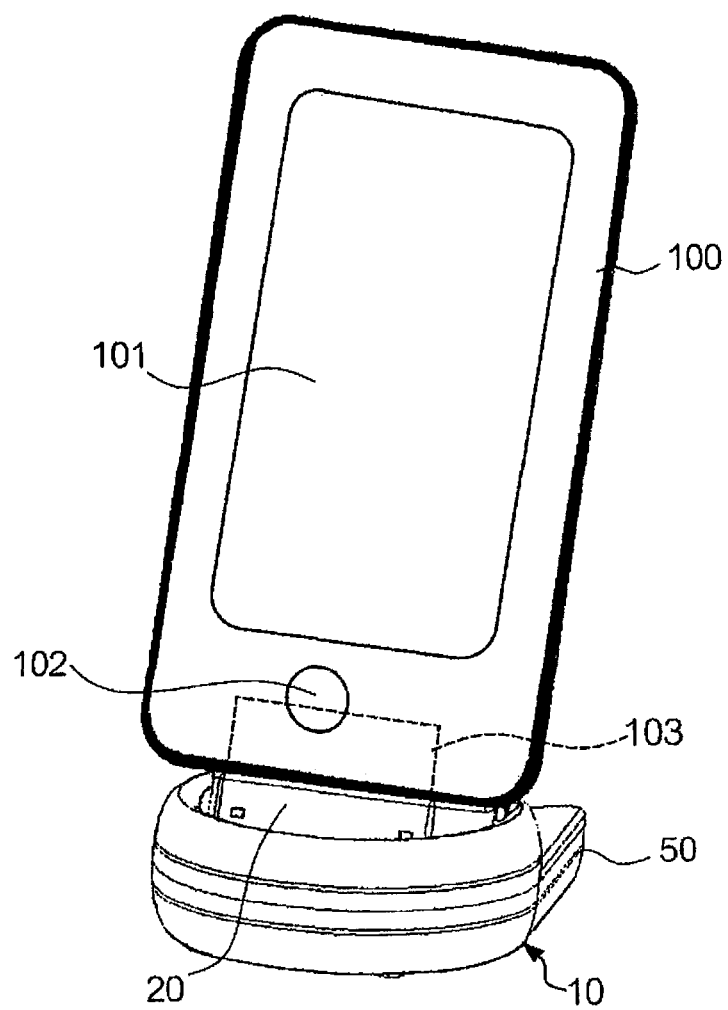
FIG. 1 is a schematic view showing a connection device according to an embodiment of the present invention.

According to an aspect of the present invention, there is provided a connection device comprising: a pedestal having a placement face; a connector provided in the placement face of the pedestal; a support provided adjacent to the pedestal and extended in a direction crossing the placement surface of the pedestal and having a face to define a space for placing a portable terminal on the connector and on a contact face in the face of the support, the contact face being movable in a thickness direction of the support; and an elastic member that is deformed by the movement of the contact face and applies an elastic force generated by the deformation of the elastic member in a direction of blocking the movement of the contact face with respect to the thickness direction of the support.

The connection device may be configured in that an attitude of the support changes with respect to the pedestal and the change of the attitude moves the contact face of the support, and the elastic member generates the elastic force for blocking the change of the attitude of the support.

The connection device may be configured in that the elastic member is at least a part of the support.

The connection device may be configured in that the contact face is protruded from the face of the support at a side of an end separate away from a boundary between the pedestal and the support.

The connection device may be configured in that the face of the support includes an inclined face extending from the boundary between the pedestal and the support, and gradually protruding toward the thickness direction of the support, and the contact face is a contact member protruded from a substantial top of the inclined face to protrude most toward the thickness direction of the support.

The connection device may be configured in that another contact member is provided so that the two contact members are arranged along a direction perpendicular to the thickness direction of the support and to the extending direction of the support.

The connection device may be configured in that another contact face is protruded from the face of the support at a position closer to the boundary between the pedestal and the support than the contact face.

The connection device may be configured in that the elastic member is a torsion coil spring provided in a space formed between the pedestal and the support at a position opposite to the space for placing the portable terminal.

The connection device may be configured in that a protrusion section is provided on a face directed toward the support, and the protrusion section is fitted in a concave section provided in the support and being open to the pedestal.

The connection device may be configured in that the support includes a support member provided so as to stand on the pedestal, and the elastic member having a plate shape is provided on the side of the support member directed toward the connector, and the elastic member includes an inclined face extending from the boundary between the pedestal and the support, and gradually protruding toward the thickness direction of the support.

The connection device may be configured in that the support includes a shock-absorbing member provided so as to enclose the circumference of the elastic member, and the contact face is protruded from a face of the shock-absorbing member at a side of an end separate away from a boundary between the pedestal and the support.

Embodiment

FIG. 1 is a schematic view showing a connection device according to an embodiment of the present invention.

As shown in FIG. 1, a holder 20 serving as an example of the connection device according to the embodiment is connected to a portable terminal 100 to be secured thereto and used. The holder 20 is mounted on an attachment 10 as necessary. The attachment 10 is placed on, for example, a horizontal base, and supported by a stand 50, thereby supporting the holder 20 mounted thereon. The holder 20 is a member for holding the portable terminal 100. The portable terminal 100 is herein a portable music player, for example. The external shape of the portable terminal 100 is formed such that the front face and the back face thereof are nearly rectangular and such that the dimension in the thickness direction between the front face and the back face is sufficiently smaller than the dimensions of the respective sides of the front face and the back face. A touch panel type display section 101 is disposed on the upper side of the front face of the portable terminal 100, and a manipulator 102 is disposed on the lower side of the front face and below the display section 101. A connector 103 is provided at the central section of the bottom face of the portable terminal 100. The connector 103 servers as an example of a second connector and is formed as a female connector having a concave shape and located in a first face serving as an example of the bottom face of the portable terminal 100.

Next, the configuration of the holder 20 will be described below in more detail.

Figure 2:
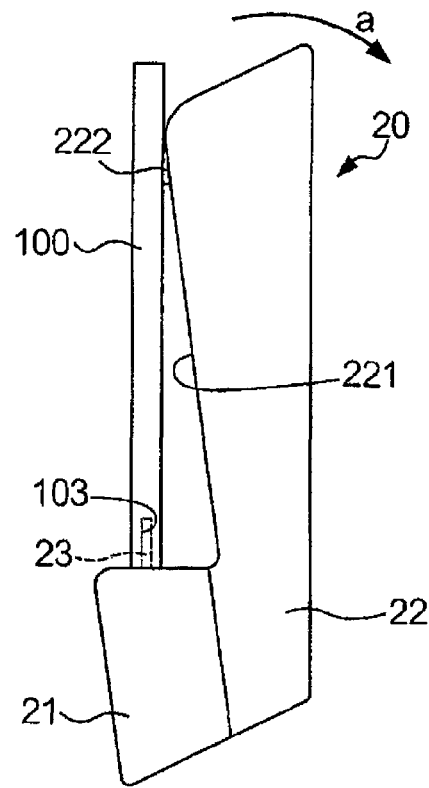
FIG. 2 is a side view showing a holder on which a portable terminal is mounted.
Figure 3:
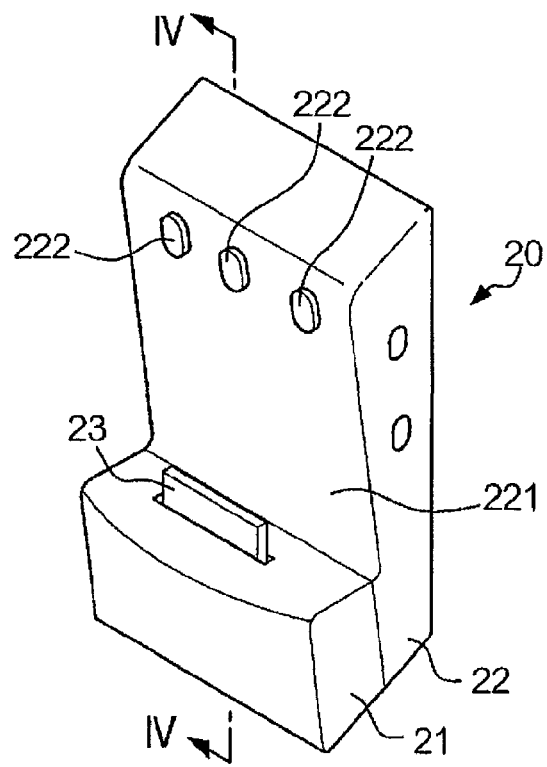
FIG. 3 is a perspective external view showing the holder.
Figure 4:
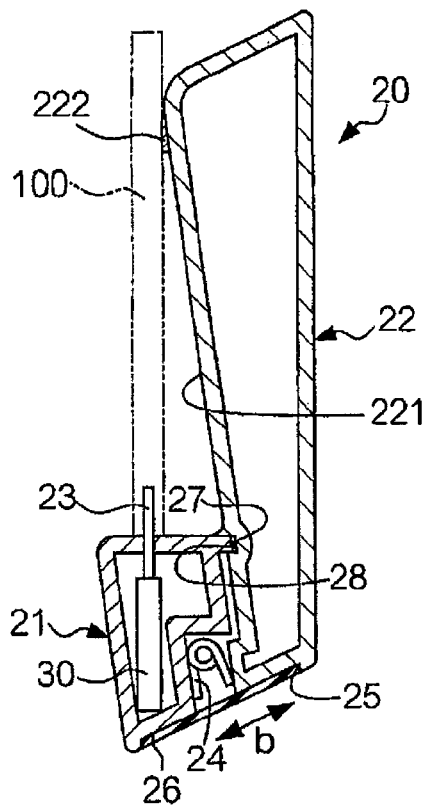
FIG. 4 is a sectional view showing the holder taken on line IV-IV shown in FIG. 3.

FIG. 2 is a side view showing the holder 20 on which the portable terminal 100 is mounted as shown in FIG. 1. FIG. 3 is a perspective external view showing the holder 20. FIG. 4 is a sectional view showing the holder 20 taken on line IV-IV shown in FIG. 3. In FIG. 4, the position of the portable terminal 100 is indicated by a two-dot chain line. The attitude of the holder 20 shown in FIGS. 2 and 4 is the same as the attitude of the holder 20 on which the portable terminal 100 is not mounted.

The holder 20 is mainly formed of a pedestal 21 and a support 22. The housing sections of the pedestal 21 and the support 22 are each made of a relatively hard material, such as a resin material (for example, ABS resin). The support 22 has a shape extending upward from the pedestal 21 when the holder 20 is viewed sideways. The shape of the holder 20 is a nearly L-shape, the shorter side thereof corresponds to the pedestal 21, and the longer side thereof corresponds to the support 22. Thus, a space for placing the portable terminal 100 is defined by the pedestal 21 and the support 22 of the nearly L-shaped holder 20.

The direction in which the support 22 of the holder 20 extends is hereafter sometimes referred to as "height direction." In addition, in the following descriptions, the term "upward" is used to indicate the upper side in the height direction of the holder 20, and the term "downward" is used to indicate the lower side in the height direction of the holder 20.

The pedestal 21 is a member on which the portable terminal 100 is placed. The upper face of the pedestal 21 is nearly flat, and a connector 23 is provided so as to protrude upward from the upper face. The connector 23 serves as an example of a first connector and is formed as a male connector protruding from the upper face of the pedestal 21. The protruding direction of the connector 23 is used as an attaching/detaching direction, and the connector 23 is fitted into the connector 103 of the portable terminal 100 placed on the pedestal 21, whereby electrical connection is established therebetween. By virtue of this mounting, the portable terminal 100 is held on the pedestal 21.

The connector 23 is mounted on a circuit section 30 built in the pedestal 21 and is secured firmly to the pedestal 21. The circuit section 30 is a member formed of a circuit board on which electronic devices are mounted. In the circuit section 30, for example, a wireless transmission circuit is formed of electronic devices. This wireless transmission circuit is used, for example, to transmit data stored in the memory of the portable terminal 100 to an external apparatus (for example, a personal computer) through wireless communication.

The support 22 provided adjacent to the pedestal 21 is a member for supporting the portable terminal 100 held on the pedestal 21 from behind the back face thereof serving as an example of a second face. The support 22 has an inclined face 221 on the side directed toward the pedestal 21. The inclined face 221 extends from the pedestal 21 along the height direction of the holder 20. The inclined face 221 is inclined so as to approach the connector 23 in the thickness direction of the portable terminal 100 mounted on the pedestal 21, the amount of the approach being larger at the upper position in the height direction. Three contact members 222 are provided on the inclined face 221 in the vicinity of a position wherein the support 22 protrudes most toward the connector 23 in the thickness direction. The contact members 222 are each formed of a small piece made of elastomer resin, for example. The contact members 222 are fitted into holes, not shown, provided in the inclined face 221 and thus secured to the support 22. The contact members 222 are provided so that the back face of the portable terminal 100 does not make direct contact with the support 22, thereby preventing the housing section of the portable terminal 100 from being damaged. Hence, the contact members 222 may be made of a material other than elastomer resin, provided that the material is higher in shock absorption performance than the material of the inclined face 221. The number of the contact members 222, three, is taken as an example, and the number may be less than three or four or more.

The contact members 222 serve as contact faces making contact with the back face of the portable terminal 100 that is held on the pedestal 21. In this case, the portable terminal 100 makes contact with the support 22 at the contact members 222, thereby being held on the holder 20 so as to be pushed against the support 22. On the other hand, the inclined face 221 excluding the face of the contact members 222 is prevented from making contact with the back face of the portable terminal 100. For this reason, a clearance is formed between the lower side of the inclined face 221 and the back face of the portable terminal 100.

Although a circuit section other than the circuit section 30 is provided inside the housing section of the support 22, such circuit is not shown and the description thereof is omitted.

A concave section 25 is provided in the bottom face of the holder 20, and a bottom face member 26 having a plate shape is fitted in the concave section 25. The bottom face member 26 is made of, for example, elastomer resin and formed into a plate shape. Since a space in which a torsion coil spring 24 is provided is covered with the bottom face member 26, the torsion coil spring 24 is not exposed outside. In addition, the bottom face member 26 may be made of a material other than elastomer resin, provided that the material is high in stretch properties.

Furthermore, as shown in FIG. 4, the torsion coil spring 24 is provided in the space formed between the pedestal 21 and the support 22 on the lower sides of the pedestal 21 and the support 22. The torsion coil spring 24 serves as an example of an elastic member and is formed of a spring member for receiving a torque around the center line of the coil extending in a direction perpendicular to the sheet plane of FIG. 4. A shaft, not shown, passes through the center of the coil, whereby the torsion coil spring 24 is secured to and supported by the pedestal 21 at the position shown in the figure. The torsion coil spring 24 may be secured to and supported by at least one of the pedestal 21 and the support 22. When the attitude of the support 22 with respect to the pedestal 21 is changed, the torsion coil spring 24 is deformed in the direction indicated by arrow 'a' shown in FIG. 2, and the deformation generates an elastic force in the return direction thereof.

Figure 5:
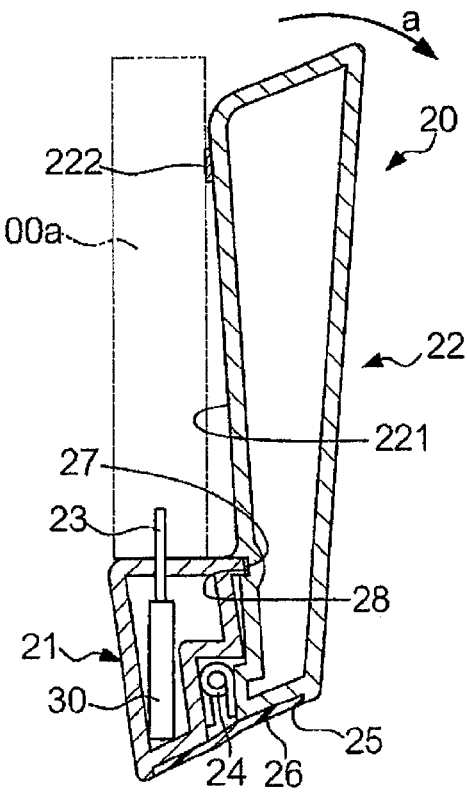
FIG. 5 is a sectional view showing the holder.

Next, the configuration of the holder 20 in the case that a portable terminal 100a thicker than the portable terminal 100 is placed on the pedestal 21 will be described below. FIG. 5 is a sectional view showing the holder 20 in the case that the portable terminal 100a is placed on the pedestal 21. The cross-section shown in FIG. 5 is a cross-section taken in the same direction as that shown in FIG. 4. Furthermore, the position of the portable terminal 100a that is held on the holder 20 is indicated by a two-dot chain line. The portable terminal 100a is a terminal having a thickness different from that of the portable terminal 100, and the front face and the back face thereof are rectangular.

In the case that the portable terminal 100a is placed on the pedestal 21, the force exerted by the portable terminal 100a to push the support 22 is larger than the force exerted by the portable terminal 100. Hence, the attitude of the holder 20 is changed from the attitude taken when the portable terminal 100 is held and is also changed from the attitude taken when no portable terminal is held. By this change in the attitude, the contact members 222 are moved in the thickness direction of the portable terminal 100a (that is, in the direction indicated by arrow 'a') from the attitude shown in FIG. 4. The thickness direction of the portable terminal 100a, indicating the movement direction of the contact members 222 serving as the contact faces, is the direction extending between the front face and the back face of the portable terminal 100a. However, the direction in which the contact members 222 are moved, that is, the direction in which the attitude of the support 22 is changed, is not limited to the direction extending between the front face and the back face of the portable terminal. This is similarly applicable in the following descriptions.

By the change in the attitude of the holder 20, the torsion coil spring 24 is deformed, and the elastic force generated by the deformation of the torsion coil spring 24 is applied to the support 22. The elastic force is applied in a direction (that is, a direction opposite to the direction indicated by arrow 'a') for blocking the movement of the support 22 to the thickness direction of the portable terminal 100a. Hence, when the portable terminal 100a is detached from the holder 20, the attitude of the support 22 with respect to the pedestal 21 is returned to the attitude shown in FIG. 4 by the elastic force.

With the above-mentioned configuration, when a thick terminal, such as the portable terminal 100a, is held on the holder 20, the contact members 222 are moved backward while the contact members 222 are opposed to and make contact with the back face of the portable terminal. Furthermore, since the inclined face 221 is inclined, portable terminals having various thickness values can be held on the holder 20 depending on the inclination. In other words, in the holder 20, the positions of the contact members 222 serving as the contact faces are adjusted depending on the thickness of the portable terminal to be secured.

Concerning the attitude of the support 22 with respect to the pedestal 21, one of the support 22 and the pedestal 21 may be regarded as a stationary side and the other one may be regarded as a movable side.

Furthermore, in the housing section of the pedestal 21, a protrusion section 27 is provided on a face directed toward the support 22. In the support 22, the protrusion section 27 is fitted in a concave section 28 being open to the pedestal 21 as shown in FIG. 4. Since the protrusion section 27 is relatively moved to be slid within the concave section 28 when the attitude of the holder 20 is changed, the attitude of the holder 20 is further stabilized. Even if the pedestal 21 is used as a pedestal (stand) for any sizes of products, the pedestal 21 can provide similar design performance.

Figure 6:
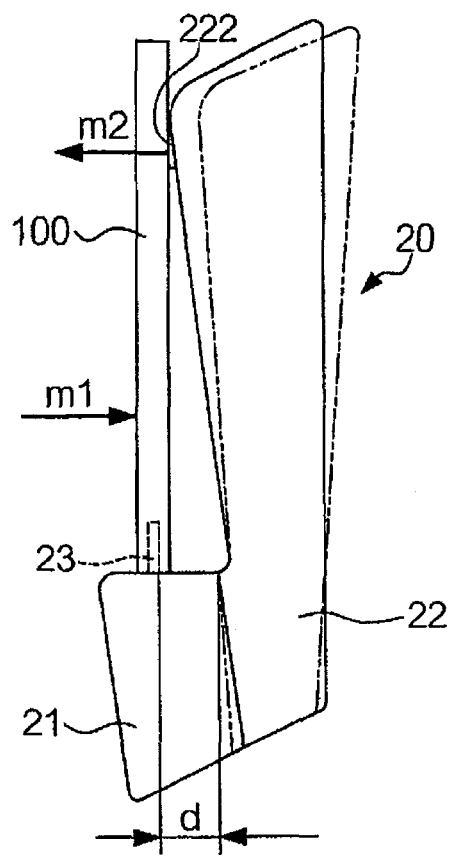
FIG. 6 is a side view showing the holder.

FIG. 6 is a side view showing the holder 20. In FIG. 6, the solid line indicates the attitude of the holder 20 in the case that the portable terminal 100 is mounted, and the two-dot chain line indicates the attitude of the holder 20 in the case that the portable terminal 100a is mounted. The solid-line arrows shown in FIG. 6 indicate examples of the directions of forces applied when the user operates the portable terminal 100 mounted on the holder 20.

As shown in FIG. 6, the distance in the thickness direction of the portable terminal 100 between the back face of the connector 23 and the boundary of the pedestal 21 and the support 22 is set to 'd'. In this case, if the distance between the back face of the portable terminal 100 and the back face of the connector 103 is approximately not more than 'd', the portable terminal can be held on the holder 20. For example, in the case that the distance is 'd', the inclined face 221 becomes nearly parallel to the protrusion direction of the connector 23 and the back face of the portable terminal as indicated by the two-dot chain line shown in FIG. 6. On the other hand, the distance between the front face of the connector 23 and the front face of the portable terminal 100 in the thickness direction of the portable terminal 100 does not have significant effect on the mounting of the holder 20.

When the user operates the portable terminal 100 mounted on the holder 20, a force (pressing force) is applied to the portable terminal 100, for example, in the direction indicated by arrow 'm1' and at the position shown in FIG. 6. On the other hand, on the back face side of the portable terminal 100, a clearance is formed between the portable terminal 100 and the support 22 around the height at which the connector 103 is provided, whereby the two do not make contact with each other. In other words, the portable terminal 100 is prevented from making contact with the support 22 at the position behind the manipulator 102 provided on the portable terminal 100. Hence, the resistance force exerted from the support 22 is not applied at the position in the height direction in which the manipulator 102 of the portable terminal 100 is provided. The resistance force is applied in the direction indicated by arrow 'm2' and opposite to the direction indicated by arrow 'm1' to the upper position of the portable terminal 100 as shown in FIG. 6. Since the force applied to the portable terminal 100 by the user is balanced with the resistance force exerted from the contact members 222 to the portable terminal 100 as described above, even when the user grips the holder 20 and operates the portable terminal 100, the attitude of the portable terminal 100 to be secured is stabilized, and the portable terminal 100 is suppressed from being wobbled. For this reason, the user can easily operate the portable terminal 100 even when it is mounted on the holder 20. In addition, even when the attitude of the holder 20 is changed as in the case that the portable terminal 100a is mounted, the user can easily operate the portable terminal 100a similarly.

Furthermore, since the contact faces are located at the position relatively away from the connector 23, the force applied by the user and the resistance force caused thereby are applied to the portable terminal 100 in nearly parallel directions and at positions different in the height direction. Hence, the force applied to the area in the vicinity of the connector 23 can be reduced in comparison with a case in which the contact faces are provided near the connector 23 and the forces are applied to the connector 23. As a result, a danger of breaking the connector 23 is reduced.

Moreover, when mounting the portable terminal 100 on the holder 20, the user should only mount the portable terminal 100 so as to push the support 22 with the portable terminal 100. Even if each of a plurality of portable terminals being different in thickness is mounted, the user can carry out the mounting without replacing any components and without requiring complicated operation. Still further, although the attitude of the support 22 with respect to the pedestal 21 is changed, it is preferable that there is not much difference in the design of the connection device, regardless of the attitude of the support 22.

As a result, even if a plurality of models being different in shape and dimensions are available due to model changes or the like in each of one series of models of a portable music player, for example, the user can use a single holder commonly for the respective models without requiring to use different holders, whereby the convenience for the user can be improved.

MODIFIED EXAMPLES

The present invention can be implemented in modes different from the above-mentioned embodiment. In addition, modified examples described below may be combined appropriately. In the following descriptions, the same components as those described in the embodiment or modified examples are designated by the same reference codes, and their descriptions are omitted.

Modified Example 1

The support 22 of the holder 20 described in the above-mentioned embodiment may be modified as described below.

Figure 7:
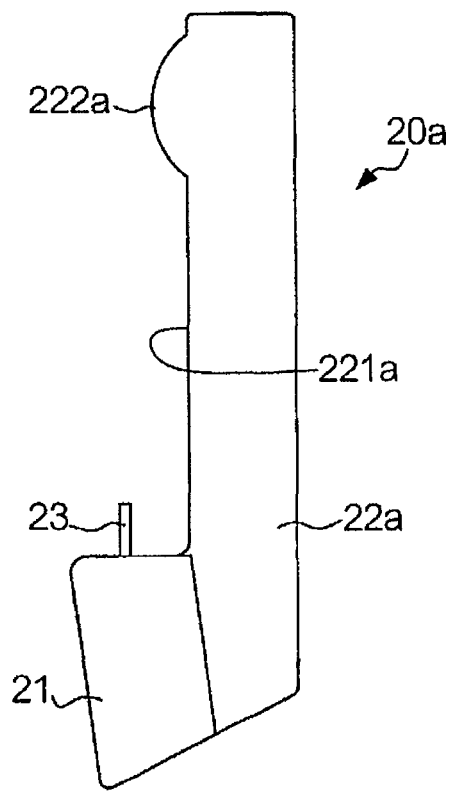
FIG. 7 is a side view showing a holder according to a modified example 1.

FIG. 7 is a side view showing a holder 20a according to modified example 1.

As shown in FIG. 7, a support 22a is configured so that the attitude thereof can be changed with respect to the pedestal 21 by virtue of a configuration equivalent to that of the embodiment. The support 22a has a face 221a on the side directed toward the pedestal 21. A protrusion section 222a protruding toward the connector 23 is provided at a position near the upper end thereof. The face 221a excluding the face of the protrusion section 222a is nearly parallel to the protrusion direction of the connector 23. With this configuration, the protrusion section 222a serves as a contact face and makes contact with the portable terminal 100 placed on the pedestal 21. The protrusion section 222a protrudes toward the connector 23 from the face 221a of the support 22a, for example. The surface of the protrusion section 222a is covered with a material being high in shock absorption performance, such as elastomer resin.

Figure 8A:
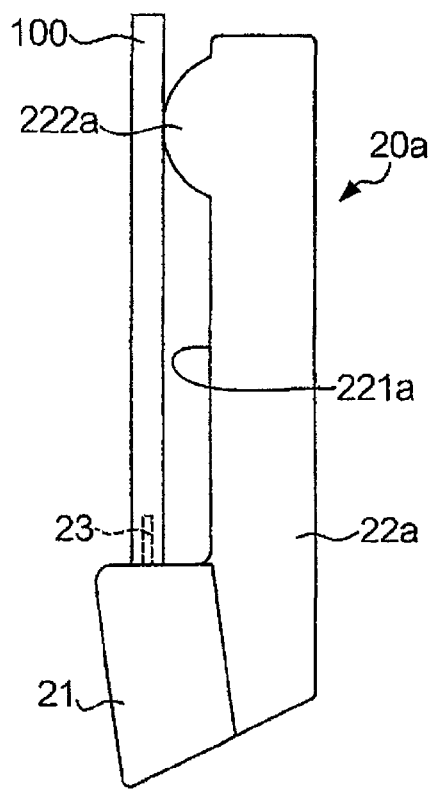
FIG. 8A is a side view showing the holder according to the modified example 1 on which a portable terminal is mounted.
Figure 8B:
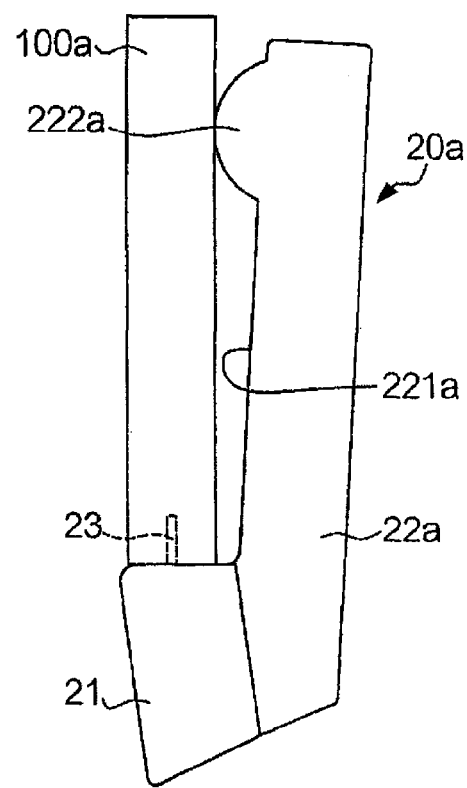
FIG. 8B is a side view showing the holder according to the modified example 1 on which another portable terminal is mounted.

FIG. 8A is a side view showing the holder 20a on which the portable terminal 100 is mounted, and FIG. 8B is a side view showing the holder 20a on which the portable terminal 100a is mounted. In the case that the portable terminal 100 is mounted as shown in FIG. 8A, the attitude of the support 22a is unchanged, and the protrusion section 222a serves as a contact face and makes contact with the portable terminal 100. On the other hand, in the case that the portable terminal 100a is mounted as shown in FIG. 8B, the protrusion section 222a is moved in the thickness direction of the portable terminal 100a by a force exerted from the portable terminal 100a to push the protrusion section 222a, whereby the attitude of the support 22a with respect to the pedestal 21 is changed. With this configuration, the portable terminal 100a makes contact with the support 22a at the protrusion section 222a, whereby the protrusion section 222a is moved by this change in the attitude.

Even in the case that the holder 20a having the above-mentioned configuration is used, the elastic force of the torsion coil spring 24 exerted in the return direction thereof is applied to the holder 20a. As a result, modified example 1 produces working effects equivalent to those of the embodiment.

Figure 9:
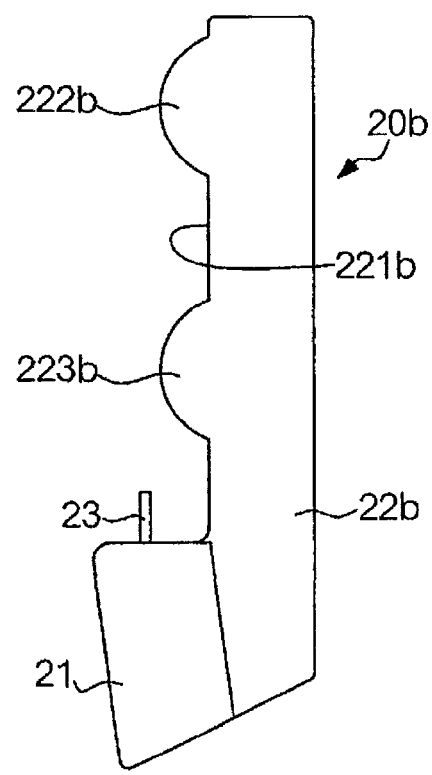
FIG. 9 is a side view showing another holder according to the modified example 1.

Furthermore, the support 22 can also be modified as shown by a support 22b in FIG. 9. The configuration of the holder 20b shown in FIG. 9 is equivalent to a configuration in which two protrusion sections are provided along the height direction of the face 221a of the holder 20a. In other words, the holder 20b has protrusion sections 222b and 223b protruding toward the connector 23 on a face 221b being nearly parallel to the protrusion direction of the connector 23. As a result, the configuration of the holder 20b also produces working effects equivalent to those of the embodiment.

The number of the protrusion sections provided on each of the faces 221a and 221b along the height direction is not limited.

Modified Example 2

Although the attitude of the support 22 with respect to the pedestal 21 is changed to move the contact members 222 in the above-mentioned embodiment, the following modification is also possible.

Figure 10:
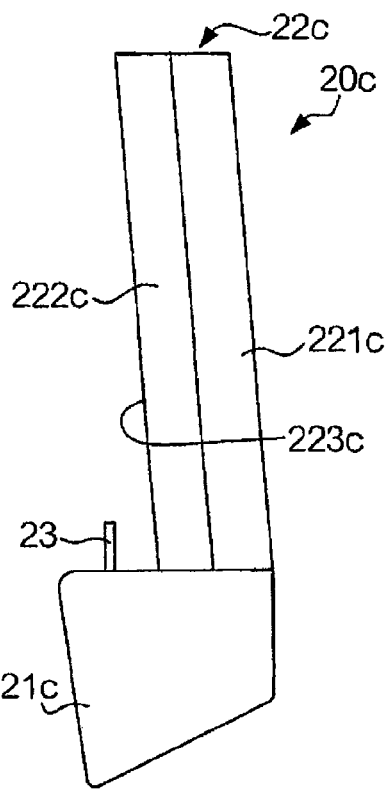
FIG. 10 is a side view showing a holder according to a modified example 2.

FIG. 10 is a side view showing a holder 20c according to modified example 2.

In the holder 20c, the support 22c thereof is secured to the pedestal 21c thereof, and such a spring member as the torsion coil spring 24 is not provided. The support 22c is mainly formed of a support member 221c and an elastic member 222c. The support member 221c is made of a resin material, such as ABS resin, and provided so as to stand on the pedestal 21c. The elastic member 222c having a plate shape is provided on the side of the support member 221c directed toward the connector 23. The elastic member 222c is made of a material having a relatively high elasticity and formed so as to have a nearly uniform thickness. The face of the elastic member 222c directed toward the connector 23 is inclined so as to approach the connector 23 in the thickness direction of the portable terminal 100, the amount of the approach being larger at the upper position in the height direction.

Figure 11A:
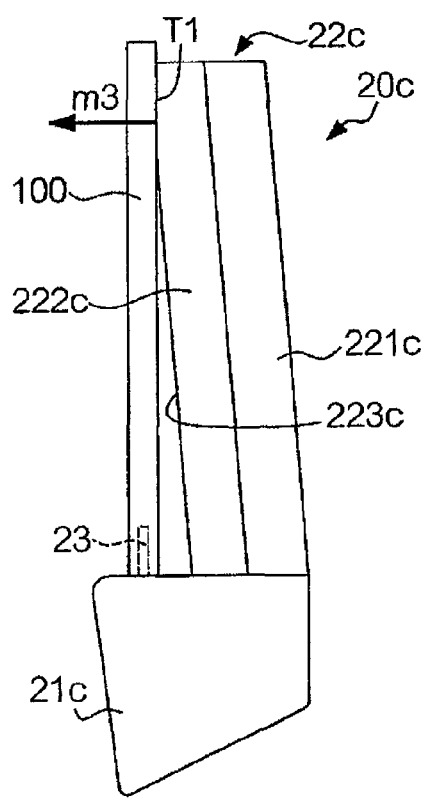
FIG. 11A is a side view showing the holder according to the modified example 2 on which a portable terminal is mounted.
Figure 11B:
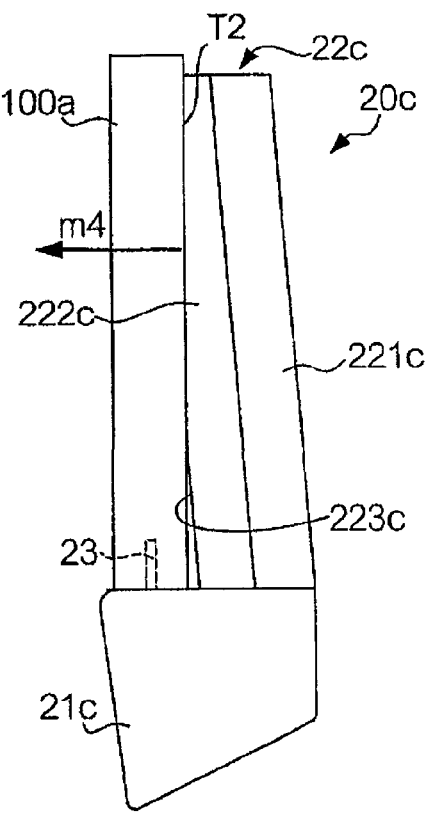
FIG. 11B is a side view showing the holder according to the modified example 2 on which another portable terminal is mounted.

FIG. 11A is a side view showing the holder 20c on which the portable terminal 100 is mounted, and FIG. 11B is a side view showing the holder 20c on which the portable terminal 100a is mounted.

In the case that the portable terminal 100 is mounted as shown in FIG. 11A, the upper part of the flat inclined face 223c of the elastic member 222c, serves as a contact face T1, and the inclined face 223c makes contact with the portable terminal 100. In this case, the elastic member 222c is deformed in the vicinity of the contact face T1, and the contact face is moved in the thickness direction of the portable terminal 100. At this time, an elastic force exerted in the direction of preventing the movement of the contact face T1 in the thickness direction is applied by the elastic member 222c from the elastic member 222c to the back face of the portable terminal 100 via the contact face T1 in the direction indicated by arrow 'm3' shown in FIG. 11A. In the case that the portable terminal 100a is mounted as shown in FIG. 11B, the inclined face 223c makes contact with the portable terminal 100a at a contact face T2 that is larger than the contact face T1. At this time, the elastic member 222c is deformed in the vicinity of the contact face T2, and the contact face is moved further in the thickness direction of the portable terminal 100a. In this case, since the elastic member 222c is also deformed in the vicinity of the contact face T2, an elastic force exerted in the direction of preventing the movement of the contact face T2 in the thickness direction is applied by the elastic member 222c from the elastic member 222c to the back face of the portable terminal 100a via the contact face T2 in the direction indicated by arrow 'm4' shown in FIG. 11B.

Even if the elastic member 222c is formed as a part of the support 22c as described above, a resistance force is also exerted against the force applied by the user at each of the contact faces T1 and T2 located relatively far away from the connector 23. As a result, modified example 2 produces working effects equivalent to those of the embodiment. In the configuration described above, the support 22c is deformed and the contact face is moved, whereby the elastic force generated by the deformation is applied to the portable terminal.

The external shape of the support member 221c is not limited to that described above. In addition, the pedestal 21c may be integrated with the support member 221c of the support 22c.

Even in the configuration of modified example 2, the contact face may be formed of protrusion sections by using the external configurations shown in FIGS. 7 and 9.

Modified Example 3

Furthermore, the following modification is also possible.

Figure 12:
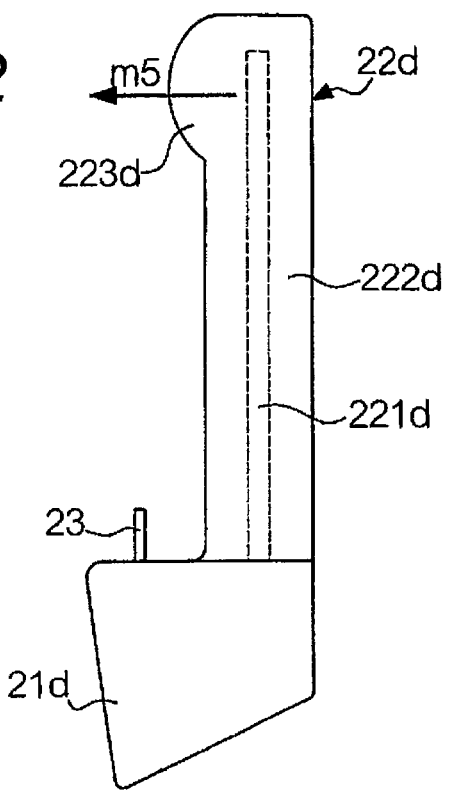
FIG. 12 is a side view showing a holder according to a modified example 3.

FIG. 12 is a side view showing a holder 20d according to modified example 3.

In the holder 20d, the support 22d thereof is secured to the pedestal 21d thereof, and such a spring member as the torsion coil spring 24 is not provided. The support 22d is mainly formed of an elastic member 221d and a shock-absorbing member 222d. The elastic member 221d is formed of a leaf spring, for example, and stands on the pedestal 21d so that its face is directed toward the pedestal 21d. The shock-absorbing member 222d is made of a material having high shock absorption performance, such as rubber. The shock-absorbing member 222d is provided so as to enclose the circumference of the elastic member 221d. The shock-absorbing member 222d protrudes toward the connector 23 at the protrusion section 223d thereof, and the protrusion section 223d serves as the contact face making contact with the portable terminal. With this configuration, the portable terminal pushes the protrusion section 223d, and the shock-absorbing member 222d is deformed by this pushing force. A part of the pushing force is then applied to the elastic member 221d. By this force, the elastic member 221d is deformed, and the elastic force generated by this deformation is applied in the direction indicated by arrow 'm5' shown in FIG. 12.

The above-mentioned configuration of the holder 20d also produces working effects equivalent to those of the embodiment. With this configuration, the elastic force to be applied to the portable terminal can be adjusted depending on the thickness, material, etc. of the shock-absorbing member 222d. In other words, the support 22d of the holder 20d is provided with both an elastic member for applying a resistance force to the contact face and a mechanism for adjusting the elastic force of the elastic member. This configuration does not prevent the support from being entirely formed of an elastic member.

Modified Example 4

Furthermore, the following modification is also possible.

Figure 13:
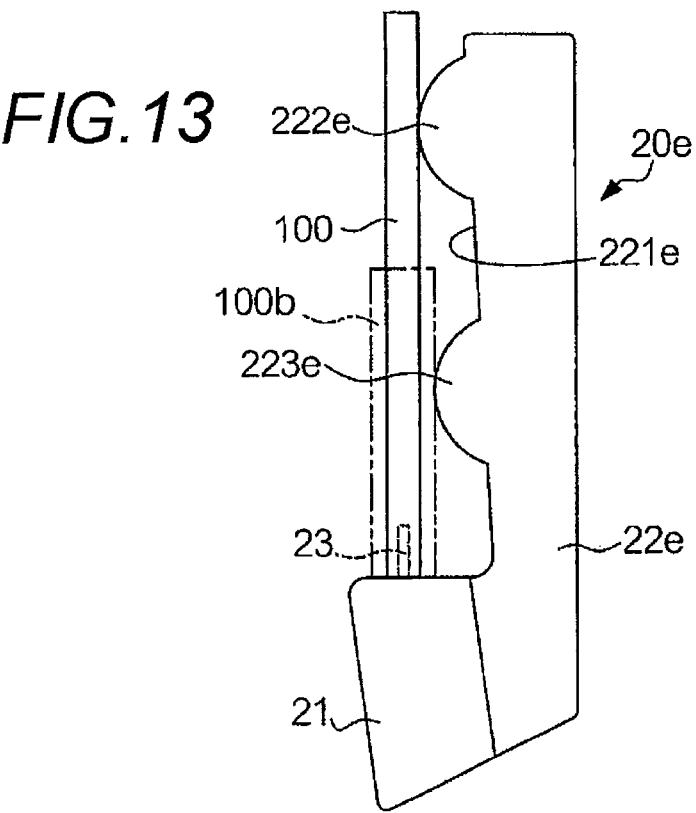
FIG. 13 is a side view showing a holder according to a modified example 4.

FIG. 13 is a side view showing a holder 20e according to modified example 4.

As shown in FIG. 13, the support 22e of the holder 20e is configured so that the attitude of the support 22e with respect to the pedestal 21 is changed by a configuration equivalent to that of the embodiment. Furthermore, the support 22e has a face 221e on the side directed toward the pedestal 21. The face 221e is inclined so as to approach the connector 23 in the thickness direction of the portable terminal 100, the amount of the approach being larger at the upper position. Furthermore, the support 22e has a protrusion section 222e protruding toward the connector 23 and a protrusion section 223e protruding toward the connector 23, the protrusion section 223e being disposed at a position lower than that of the protrusion section 222e.

In the holder 20e configured as described above, the protrusion section 223e as well as the protrusion section 222e can function as a contact face. The protrusion sections 222e and 223e protrude outward from the face 221e and the surfaces thereof are covered with a material being high in shock absorption performance, such as elastomer resin.

As shown in FIG. 13, in the case that the portable terminal 100 is mounted, the attitude of the support 22e with respect to the pedestal 21 is unchanged, and the support 22e makes contact with the portable terminal 100 by using the protrusion section 222e as a contact face. In the case that the portable terminal 100a is mounted, the attitude of the holder 20e is changed as in the case of the embodiment. On the other hand, in the case that a portable terminal 100b being small in height and large in thickness is mounted as indicated by a two-dot chain line shown in FIG. 13, the attitude of the support 22e is changed by the force exerted from the portable terminal 100b to push the protrusion section 223e depending on the thickness of the portable terminal 100b. The portable terminal 100b is different from the portable terminal 100 in thickness and height, and the front and back faces thereof are rectangular. This configuration also produces working effects equivalent to those of the embodiment. Moreover, with the configuration of the holder 20e, portable terminals being different not only in thickness but also in height can be mounted on the holder 20e, whereby it is expected that the configuration has higher versatility.

Modified Example 5

In the embodiment and modified examples described above, instead of the configuration in which the attitude of the entire support is changed with respect to the pedestal, a configuration may be adopted in which the attitude of only a portion thereof including the contact face is changed. For example, the support is formed of a first support provided adjacent to the pedestal and a second support provided above the first support, and the attitude of the second support with respect to the first support is changed, whereby the contact face of the second support is moved. The configuration relating to this change of the attitude can be attained by using a spring member, such as the torsion coil spring 24, as in the case of the embodiment. In this case, the first support may be formed of a member integrated with the pedestal.

In addition, in each of the configurations according to modified examples 2 and 3, a member corresponding to the elastic member may be provided only in an area near the upper end of the support, in other words, in a part of the support.

Furthermore, the contact face of the support may be provided not only at a position near the upper end but also at a central or lower position in the height direction.

In the above-mentioned embodiment, although the portable terminal 100 is a portable music player, the present invention can be applied to the other terminals. Furthermore, the present invention can also be applied to communication terminals, such as a PDA (personal digital assistance), and various portable terminals, such as digital cameras and portable game devices.

Furthermore, in the above-mentioned embodiment, although a part of the inclined face 221 is used as a contact face, a mode in which the entire face thereof is used as a contact face may also be included depending on the thickness of the portable terminal 100. Since the resistance force to be applied to the connector is distributed to the entire contact face in this case, it is also possible to prevent an excessive force from being applied to the connector 103.

Moreover, the connector on the side of the portable terminal may be formed as a male connector and protrude, and the connector on the side of the pedestal may be formed as a female connector having a concave shape.

What is claimed is:

1. A connection device comprising: a pedestal having a placement face; a connector provided in the placement face of the pedestal; a support provided adjacent to the pedestal and extended in a direction crossing the placement surface of the pedestal and having a face to define a space for placing a portable terminal on the connector and on a contact portion in the face of the support, wherein the contact portion is movable and the support is rotatable in a direction away from the portable terminal when the contact portion contacts the portable terminal to change an inclination of the support with respect to the pedestal, and an amount of movement of the contact portion and an amount of rotation of the support are changed depending on a thickness of the portable terminal; and an elastic member that is deformed by the movement of the contact portion and the rotation of the support and applies an elastic force generated by the deformation of the elastic member in a direction of blocking the movement of the contact portion and the rotation of the support.

2. The connection device according to claim 1, wherein the elastic member is at least a part of the support.

3. The connection device according to claim 1, wherein the contact portion is protruded from the face of the support at a side of an end separate away from a boundary between the pedestal and the support.

4. The connection device according to claim 3, wherein the face of the support includes an inclined face extending from the boundary between the pedestal and the support, and gradually protruding toward the thickness direction of the support, and the contact portion protrudes from a substantial top of the inclined face to protrude most toward the thickness direction of the support.

5. The connection device according to claim 4, wherein another contact portion is provided so that the two contact portions are arranged along a direction perpendicular to the thickness direction of the support and to the extending direction of the support.

6. The connection device according to claim 3, wherein another contact portion is protruded from the face of the support at a position closer to the boundary between the pedestal and the support than the contact portion.

7. The connection device according to claim 1, wherein the elastic member is a torsion coil spring provided in a space formed between the pedestal and the support at a position opposite to the space for placing the portable terminal.

8. The connection device according to claim 7, wherein a protrusion section is provided on a face directed toward the support, and the protrusion section is fitted in a concave section provided in the support and being open to the pedestal.

9. The connection device according to claim 2, wherein the support includes a support member provided so as to stand on the pedestal, and the elastic member having a plate shape is provided on the side of the support member directed toward the connector, and the elastic member includes an inclined face extending from the boundary between the pedestal and the support, and gradually protruding toward the thickness direction of the support.

10. The connection device according to claim 2, wherein the support includes a shock-absorbing member provided so as to enclose the circumference of the elastic member, and the contact portion is protruded from a face of the shock-absorbing member at a side of an end separate away from a boundary between the pedestal and the support.

* * * * *